(12) United States Patent
Harada et al.

(10) Patent No.: US 7,833,445 B2
(45) Date of Patent: Nov. 16, 2010

(54) PROCESS FOR PRODUCING FOAMED BODY OF THERMOPLASTIC RESIN

(75) Inventors: Hiroshi Harada, Kyoto (JP); Hitoshi Kawauchi, Kyoto (JP); Hiroyuki Hirano, Kyoto (JP); Satoshi Shimura, Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 1252 days.

(21) Appl. No.: 11/075,737

(22) Filed: Mar. 10, 2005

(65) Prior Publication Data

US 2005/0179158 A1    Aug. 18, 2005

Related U.S. Application Data

(62) Division of application No. 10/069,717, filed on Feb. 28, 2002, now Pat. No. 7,195,815.

(51) Int. Cl.
    B29C 44/42    (2006.01)
(52) U.S. Cl. .................... 264/50; 264/328.7
(58) Field of Classification Search ............ 264/50, 264/51, 328.7
    See application file for complete search history.

(56) References Cited

U.S. PATENT DOCUMENTS

| | | | |
|---|---|---|---|
| 3,793,415 A | 2/1974 | Smith | |
| 3,812,225 A | 5/1974 | Hosoda et al. | |
| 3,863,000 A | 1/1975 | Kasai et al. | |
| 3,954,926 A | 5/1976 | Pahl et al. | |
| 4,629,745 A | 12/1986 | Hoki et al. | |
| 5,116,881 A | 5/1992 | Park et al. | |
| 5,252,269 A * | 10/1993 | Hara et al. | 264/45.3 |
| 5,281,376 A * | 1/1994 | Hara et al. | 264/46.4 |
| 5,474,723 A | 12/1995 | Horikoshi | |
| 5,547,621 A | 8/1996 | Naritomi | |
| 5,575,871 A | 11/1996 | Ryoshi et al. | |
| 6,040,375 A | 3/2000 | Behme et al. | |

(Continued)

FOREIGN PATENT DOCUMENTS

EP    0 799 853-A-1    10/1997

(Continued)

OTHER PUBLICATIONS

Handbook of Plastic Foams, Landrock-editor, 1995, Noyes Publications, pp. 221-245.*

(Continued)

Primary Examiner—Jill L Heitbrink
(74) Attorney, Agent, or Firm—Cheng Law Group, PLLC

(57) ABSTRACT

The invention provides a foamed body of thermoplastic resin having a high expansion ratio, desired shape and cells of desired diameter, especially fine cells. The foamed body of thermoplastic resin is produced by filling the thermoplastic resin containing a foaming agent into a cavity 31 of a mold 2a and thereafter enlarging the cavity 31 to expand the resin. In this process, the cavity 31 is completely filled with the resin as melted and containing the foaming agent, then held in its shape as filled with the resin and enlarged to an increased final cavity width upon the average temperature filled in the cavity 31 reaching the range from the melting point of the resin to the melting point plus 30° C.

3 Claims, 10 Drawing Sheets

U.S. PATENT DOCUMENTS 6,213,540 B1    4/2001    Tusim et al.

FOREIGN PATENT DOCUMENTS

| EP | 0 839 624 A2 | 5/1998 |
| FR | 2 707 549 A1 | 1/1995 |
| JP | 54-057573 A1 | 5/1979 |
| JP | 07-088878 A1 | 4/1995 |
| JP | 08-090599 A1 | 4/1996 |
| JP | 08-300391 A1 | 11/1996 |
| JP | 08-318542 A1 | 12/1996 |
| JP | 10-230528 A | 9/1998 |
| JP | 11-019961 A | 1/1999 |
| JP | 2000-037744 A1 | 2/2000 |

OTHER PUBLICATIONS

Plastics Additives—An A-Z Reference, Pitchard-editor, 1998, Springer-Verlag Publisher, pp. 142-147.*

International Search Report for the Application No. PCT/JP00/05776 mailed Nov. 14, 2000.

* cited by examiner

PROCESS FOR PRODUCING FOAMED BODY OF THERMOPLASTIC RESIN

RELATED APPLICATION

This application is a divisional application of patent application Ser. No. 10/069,717, filed on Feb. 28, 2002 now U.S. Pat. No. 7,195,815.

TECHNICAL FIELD

The present invention relates to a process for producing foamed bodies of thermoplastic resin by filling the cavity of a mold with the thermoplastic resin as melted and containing a foaming agent and thereafter enlarging the cavity, and to molds for use in the process for producing the resin foamed body. The invention relates also to foamed bodies of thermoplastic resin which have high compressive rigidity and high flexural rigidity in the direction of thickness.

BACKGROUND ART

As already disclosed, for example, in the publication of JP-B No. 51-8424(1976), a process is known for producing a foamed body of thermoplastic resin by filling the cavity of a mold with the thermoplastic resin as melted and containing a foaming agent and thereafter enlarging the cavity. As shown in FIG. 12 by a line 91, the cavity is enlarged in this process at a rate of V2 for a period of time T2 after the completion of filling.

Further known is a process wherein the cavity is enlarged at different rates to obtain a foamed body having a desired feel to the touch by controlling the thickness of a nonexpanded skin layer as disclosed, for example, in the publication of JP-A No. 7-88878(1995). With this process, the cavity is enlarged at a rate of V1 until time T1 after the completion of filling and then at a lower rate V3 from time T1 to time T2.

The publications of JP-B No. 51-8424(1976) and JP-A No. 6-198668(1994) disclose a process wherein the cavity of a mold used is enlarged for forming a foamed body of thermoplastic resin. This process prepares an expanded molding by filling the cavity with the thermoplastic resin as melted and containing a foaming agent and thereafter forcing the cavity to enlarge rapidly by a predetermined amount.

The foamed body is produced by this process by filling the thermoplastic resin containing a foaming agent into the cavity as held diminished from the final shape thereof and subsequently enlarging the cavity to the size of the final product.

However, the conventional processes for producing foamed bodies of thermoplastic resin have the problem that it is difficult to obtain foamed bodies of great expansion ratio, for example, those having heat-insulating properties and an expansion ratio of at least 5 times. Another problem encountered is that the conventional process affords only those having a definite cell diameter as large as at least several millimeters, producing only hollow moldings in the case of unsuited conditions.

Additionally the conventional processes have the problem that the resin fails to fully expand in the cavity corners in conformity with the enlargement of the cavity. Stated more specifically, when a resin 104 containing a foaming agent is filled into a cavity 103 defined by a fixed mold 101 and a movable mold 102 as shown in FIG. 13(a) and when the cavity 103 is thereafter enlarged by moving the movable mold 102 toward the direction of arrow 107 as shown in FIG. 13(b), it is likely that the thermoplastic resin 104 will fail to expand in the corners of the cavity 103 in conformity with the enlargement of the cavity 103, consequently affording only a foamed body 106 which is recessed at corners 105.

An object of the present invention, which is accomplished in view of the foregoing problems of the prior art, is to overcome these problems and to provide a process for producing a foamed body of thermoplastic resin of desired shape having a high expansion ratio and containing fine cells of desired diameter, and a mold for use in the process for forming foamed bodies of thermoplastic resin.

On the other hand, the publication of JP-A No. 10-230528 (1998) discloses a process for producing a foamed body having a surface layer of nonexpanded portion integral therewith and satisfactory in surface appearance and having fine closed cells with a uniform average cell density, using carbon dioxide or nitrogen in a supercritical state as a foaming agent.

The publication of JP-A No. 8-108440(1996) discloses an expanded board of polyolefin resin having a cell structure of closed cells (a) at least 85% of which are 2.5 to 10.0 in the ratio of the size thereof in a direction perpendicular to the plane of the board to the size thereof in a direction parallel to the board, and (b) at least 70% of which are up to 500 μm in size in a direction parallel to the plane of the board, the expanded board being at least 2 in the ratio of the compressive strength thereof in a direction perpendicular to the plane of the board to the compressive strength thereof in a direction parallel to the plane of the board, and 5 to 20 times in expansion ratio. This expanded board of polyolefin resin is produced from a mixture of the polyolefin resin, a chemical foaming agent and a crosslinking agent by applying pressure to the mixture using molds having opposed parallel inner surfaces, heating the mixture at a temperature not lower than the decomposition temperature of the foaming agent, and subsequently increasing the distance between the molds to expand the polyolefin resin only in a direction perpendicular to the inner surfaces through which the pressure is applied. This process involves ingenuity to produce a flatted cell structure to achieve both a low density and high compressive rigidity.

Since the production process of JP-A No. 10-230528 (1998) is an injection molding process, the foamed body obtained is nevertheless low in compressive strength and in properties to absorb great impact because of its structure of fine and uniform closed cells although having shape conformability. The product therefore needs to be given a higher density so as to be improved in physical properties, whereas this entails the problem of making the molding heavier and impaired in heat-insulating properties.

The molding of JP-A No. 8-108440(1996) consists solely of an expanded layer providing a single-layer structure and is therefore low in flexural strength and small in deformation limit due to the presence of closed cells. The process as described above also has the problem of affording moldings only in the form of a board. The use of the chemical foaming agent results in an increased cost and permits the unreacted components and decomposed products pf the agent to remain in the foamed body, consequently entailing discoloration of the foamed body, release of odor therefrom and problems of food hygiene.

In view of the above situations, another object of the present invention is to provide a foamed body of thermoplastic resin which has high compressive rigidity and high flexural rigidity in the direction of thickness thereof, lightweight, outstanding in heat-insulating properties and impact absorbing properties and free from the residues of chemical foaming agent.

DISCLOSURE OF THE INVENTION

The present invention has been accomplished to fulfill the above objects. The invention provides as a first feature thereof a process for producing a foamed body of a thermoplastic resin by filling the thermoplastic resin as melted and containing a foaming agent into a cavity of a mold and thereafter enlarging the cavity to expand the resin, the process being characterized by holding the cavity in the shape thereof during filling after the molten resin containing the foaming agent is completely filled into the cavity and enlarging the cavity to an increased final cavity width upon the average temperature of the molten resin within the cavity reaching the range of the melting point of the resin to [the melting point +30° C.].

The present invention provides as a second feature thereof a process for producing a foamed body of a thermoplastic resin by filling the thermoplastic resin as melted and containing a foaming agent into a cavity of a mold and thereafter enlarging the cavity to expand the resin, the process being characterized in that the process includes the primary cavity enlarging step of enlarging the cavity to a predetermined value less than an increased final cavity width upon the average temperature of the molten resin within the cavity reaching the range of the melting point of the resin to [the melting point +60° C.] after holding the cavity in the shape thereof as filled with the molten resin containing the foaming agent subsequently to complete filling of the cavity, and the secondary cavity enlarging step of subsequently interrupting the enlargement of the cavity and enlarging the cavity to the increased final cavity width upon the temperature of the resin in its central portion with respect to the thickness thereof reaching a temperature from the melting point to [the melting point +50° C.].

The present invention provides as a third feature thereof a process for producing a foamed body of a thermoplastic resin, the process being one mode of practicing the process of the first feature and characterized in that the process includes the steps of holding the cavity in the shape thereof as filled with the resin for a predetermined period of time after the molten resin containing the foaming agent is completely filled into the cavity, and enlarging the cavity to an increased final cavity width after the predetermined period of time.

The invention provides a fourth feature thereof a process for producing a foamed body of a thermoplastic resin, the process being one mode of practicing the process of the second feature and characterized in that the process includes the primary cavity enlarging step of enlarging the cavity to a predetermined value less than an increased final cavity width a predetermined period of time after the molten resin containing the foaming agent is completely filled into the cavity, and the secondary cavity enlarging step of enlarging the cavity to the increased final cavity width after interrupting the enlargement of the cavity for a specified period of time.

The invention provides as a fifth feature thereof a process for producing a foamed body of a thermoplastic resin which is characterized by enlarging the cavity to the increased final cavity width at a rate of 2 to 5 mm/sec in a process according to the first or third feature of the invention, and enlarging the cavity at a rate of 2 to 5 mm/sec in the primary cavity enlarging step in a process according to the second or fourth feature of the invention.

The invention provides as a sixth feature thereof a process for producing a foamed body of a thermoplastic resin according to the second, fourth or fifth feature of the invention, the process being characterized by enlarging the cavity at a rate of 5 to 10 mm/sec in the secondary cavity enlarging step.

The invention provides as a seventh feature thereof a process for producing a foamed body of a thermoplastic resin according to any one of the first to the sixth features of the invention, the process being characterized in that the foaming agent is an inert gas, namely a gas which is unreactive to the resin.

The term the "direction of forward movement" as used herein refers to the direction in which the movable piece moves toward a gate portion of the cavity so as to diminish the cavity and therefore to the direction indicated at 51 in FIG. 4(b). The term the "direction of rearward movement" refers to the direction in which the movable piece moves away from the gate portion of the cavity so as to enlarge the cavity, and accordingly to the direction indicated at 52 in FIG. 4(b).

The invention provides as an eighth feature thereof a mold for forming a foamed body of a thermoplastic resin by filling the thermoplastic resin as melted and containing a foaming agent into a cavity defined by a stationary mold member and a movable mold member of a mold and thereafter enlarging the cavity to expand the resin and produce the foamed body thereof, the mold being characterized in that the movable mold member comprises a movable piece 221a movable forward or rearward along the direction of thickness of the cavity and an immovable piece outside the movable piece, the movable piece being so shaped as to define a peripheral cavity space 32 by the immovable piece, an outer peripheral surface of the movable piece and a peripheral cavity wall 33 and a main cavity space 34 by a front end face of the movable piece and a cavity wall 35 opposed thereto when the movable piece is moved forward.

The peripheral cavity space 32 can be in the form of an integral tube and can be rectangular parallelepipededal or otherwise polygonal or circular in cross section.

With reference to FIG. 4(a), a movable piece 221a provided on a movable mold member 22a forms a tubular cavity 31 having a bottom and, for example, a recessed section along the direction of forward or rearward movement when moved forward to the greatest extent. The bottomed tubular cavity 31 comprises a peripheral cavity space 32 defined by the outer peripheral surface of the movable piece 221a and a cavity peripheral surface 33, and a main cavity space 34 defined by the front end face of the movable piece 221a and a cavity wall 35 opposed thereto.

The invention provides as a ninth feature thereof a mold for forming a foamed body of a thermoplastic resin according to the eighth feature of the invention, the mold being characterized in that the length t5 of the peripheral cavity space 32 in the direction of forward or rearward movement is greater than the width t3 of the main cavity space 34 in the direction of forward or rearward movement.

With reference to FIG. 4(a), it is desired that the length t5, along the direction of forward or rearward movement, of the peripheral cavity space 32 of the tubular cavity 31 having a bottom and, for example, a recessed section be greater than the width t3 of the main cavity space 34.

The invention provides as a tenth feature thereof a mold for forming a foamed body of a thermoplastic resin according to the eighth or ninth feature of the invention, the mold being characterized in that the length t5 of the peripheral cavity space 32 in the direction of forward or rearward movement is 50 to 70% of an increased final cavity width t6.

With reference to FIG. 4(a), the length t5, along the direction of forward or rearward movement, of the peripheral cavity space 32 of the tubular cavity 31 having a bottom and, for example, a recessed section is preferably 50 to 70%, more preferably 60 to 65%, of the increased final cavity width t6.

If the length t5 is smaller than 50% of the increased final cavity width t6, the foamed body of thermoplastic resin obtained has a peripheral portion failing to conform to the shape of the mold. It is then likely that the product of the desired shape will not be available. If the length t5 is greater than 70% of the increased final cavity width t6, the foamed body of thermoplastic resin obtained is likely to have wrinkles and an impaired appearance.

The invention provides as an eleventh feature thereof a mold for forming a foamed body of a thermoplastic resin according to the eighth, ninth or tenth feature of the invention, the mold being characterized in that the width t4 of the peripheral cavity space 32 is two to four times the width t3 of the main cavity space 34.

With reference to FIG. 4(a), the width t4 of the peripheral cavity space 32 is 2 to 4 times, preferably 2.7 to 3.5 times, the width t3 of the main cavity space 34.

If the width t4 of the peripheral cavity space 32 is smaller than twice the width t3 of the main cavity space 34, the peripheral portion of the foamed thermoplastic resin body to be obtained fails to conform to the shape of the mold, and it is likely that a foamed body of the desired shape will not be available. If the width t4 of the peripheral cavity space 32 is greater than four times the width t3 of the main cavity space 34, the foamed body of thermoplastic resin will deform when cooled insufficiently, failing to have the desired shape. An attempt to cool the body sufficiently is likely to entail greatly lowered productivity. It is also likely that the thermoplastic resin within the peripheral cavity space 32 will not be expanded to a full extent.

The thermoplastic resin to be used in the present invention is not limited specifically. Examples of useful resins are polyethylene, polypropylene, ethylene-propylene copolymer, ethylene-propylene-diene copolymer, ethylene-vinyl acetate copolymer, polybutene, chlorinated polyethylene and like olefin resins, polystyrene, styrene-butadiene-styrene copolymer, styrene-isoprene-styrene resin, polymethyl acrylate, ethylene-ethyl acrylate copolymer and like acrylic resins, polyvinyl chloride and like chlorine resins, polyethylene fluoride and like fluorocarbon resins, 6-nylon, 66-nylon, 12-nylon and like polyamide resins, polyethylene terephthalate, polybutylene terephthalate and like polyester resins, ABS resin, polycarbonate, polyacetal, polyphenylene sulfide, polyether ether ketone, polyether imide, silicone resin, thermoplastic urethane, various elastomers, etc.

Especially preferable among these examples are resins having melt tension or stretch viscosity suitable for expansion. Such resins favorably usable are, for example, polyethylene, polypropylene, polystyrene, ABS resin, polyvinyl chloride, etc. Examples of useful polyethylene and polypropylene are finely crosslinked resins which are adjusted in stretch viscosity characteristics.

These resins can be used singly or at least two of them can be used in the form of an alloy, blend or composite.

The term the "melting point" is defined as the temperature at which a resin changes from a fluid state to a nonfluid state. In the case of crystalline resins such as polyethylene, polypropylene, polyacetal, polybutylene terephthalate, the melting temperature Tpm measured according to JIS K7121 is used as the melting point. In the case of noncrystalline resins such as polystyrene, polyvinyl acetate, polymethyl methacrylate, polycarbonate and ABS resin, the glass transition temperature Tmg measured according to JIS K7121 is taken as the melting point. Although vinyl chloride is a crystalline resin, the thermal decomposition temperature thereof is approximate to the melting temperature Tpm thereof, and the resin is molded at a temperature of up to the melting temperature Tpm. In the case of the crystalline resins which are molded at a temperature of not higher than the melting temperature Tpm, [the melting temperature Tpm−30° C.] is taken as the melting point. Similarly, with the noncrystalline resins which are molded at a temperature of up to glass transition temperature Tmg, [the glass transition temperature Tmg−30° C.] is taken as the melting point.

The term the "average temperature of the resin" as used herein is defined as the average value of temperature of the resin layer filled in the mold cavity in the direction of thickness of the layer. Although the temperature in the direction of thickness of the resin layer is not limited particularly, the temperature is preferably the value at the midportion of the mold gate portion and the forward end of the resin layer, i.e., at the midportion of the thickness of the layer.

The temperature of the resin as melted and filling the mold is determined, for example, by measuring the temperature of the filled resin layer with an infrared temperature sensor installed in the mold, or by calculating the temperature of the filled resin layer by CAE injection flow analysis.

The expressions "holding the cavity as filled" and "interrupting enlargement of the cavity" as used herein mean the state of the movable piece substantially at a halt, and refer to the state in which the rate of enlargement by the movable piece is up to 0.1 mm/sec. However, the rate of enlargement by the movable piece is preferably 0 mm/sec.

The foaming agent for use in the present invention is not limited particularly, but usable are organic or inorganic thermally decomposable chemical foaming agents or physical foaming agents. Examples of useful chemical foaming agents are azo compounds, hydrazide compounds, nitroso compounds, semicarbazide compounds, hydrazo compounds, tetrazole compounds, ester compounds, bicarbonates, carbonates, nitrites, etc. More specific examples are azodicarbonamide (ADCA), isobutyronitrile (AZDN), benzenesulfonylhydrazo (OBSH), dinitropentamethylenetetramine (DPT), azobisisobutyronitrile (AIBN), p-toluene-sulfonhydrazide (TSH), barium azodicarboxylate (Ba-AC), etc. Examples of physical foaming agents are carbon dioxide gas, argon, neon, helium, oxygen and like nonreactive gases. These agents can be used singly, or at least two of them are usable in combination.

The method of enlarging the mold cavity is not limited particularly. For example, the movable piece of the mold is moved toward a direction by a hydraulic mechanism for an injection molding machine as shown in FIGS. 2 and 3 or an external hydraulic device and a hydraulic piston to enlarge the cavity, or the cavity is enlarged utilizing a mold opening mechanism for an injection molding machine as shown in FIGS. 5 and 6.

The "cavity width resulting from the primary cavity enlarging step" according to the second, fourth or fifth feature of the invention is not limited particularly if the width is not greater than the increased final cavity width t6. However, the width is preferably up to 3.0 times the width t3 of the main cavity space 34 in the direction of forward or rearward movement, more preferably up to 6.5 mm. If the width increased by the primary enlargement is excessively great, the cell film is likely to break, joining large numbers of small cells into large cells.

The "rate of primary cavity enlargement step" according to the second, fourth or fifth feature of the invention and the "rate of enlargement to the final cavity width" according to the first, third or fifth feature of the invention are preferably 0.5 to 15 mm/sec, more preferably 2 to 5 mm/sec. If the cavity enlargement rate is too low, only a foamed body of large cells is obtained. If the rate is excessively high, the resin surface separates from the mold once and is then transferred onto the mold surface again during the subsequent step of interrupting the cavity movement. This is likely to give rise to the problem of impairing the appearance of the surface of the molding.

According to the third feature of the invention, the period of time during which the cavity is held as filled with the resin immediately after the completion of filling until the start of enlargement of the cavity is dependent on the temperature of the resin filled, the temperature of the mold, etc., and is preferably 2 to 20 sec, more preferably 2 to 15 sec. If the holding time is too long, the skin layer over the surface of the resin becomes thick to substantially reduce the thickness of the expanded layer. This entails the likelihood that only a foamed body of low expansion ratio will be available.

According to the fourth feature of the invention, the period of time during which the cavity is held as filled with the resin immediately after the completion of filling until the start of primary enlargement of the cavity is preferably 0.1 to 11 sec, more preferably 0.5 to 5 sec. The period of time during which the enlargement of the cavity is interrupted between the primary and secondary cavity enlarging steps is preferably 0.5 to 30 sec, more preferably 3 to 20 sec. If the duration of interruption is too short, the cell film will break as when the amount of cavity enlargement is great in the primary cavity enlarging step, consequently entailing the likelihood that cells will join into larger cells. If the duration of interruption is excessively long, the resin becomes cooled, with the ability of the resin to stretch exceeding the expansion pressure, with the result that the resin will fail to expand to the desired amount of cavity enlargement or will develop surface irregularities different from the shape of the mold.

The "rate of secondary cavity enlargement" according to the second, fourth or sixth feature of the invention is preferably 0.5 to 15 mm/sec, more preferably 5 to 10 mm/sec. If the rate is too low, the resin becomes cooled during the enlargement of the cavity, with the ability of the resin to stretch exceeding the expansion pressure. As a result, the resin fails to expand to the desired increased cavity width or is likely to develop surface irregularities different from the shape of the mold. When the rate of cavity enlargement is excessively great, the resin surface separates from the mold once and is transferred onto the mold surface again when the cavity is brought to a halt at the final position of cavity enlargement. This is likely to give rise to the problem of impairing the appearance of the surface of the molding.

Next, the invention will be described below with respect to foamed bodies of thermoplastic resin.

The present invention provides as a twelfth feature thereof a foamed body of a thermoplastic resin comprising an expanded inner layer portion and two surface layer portions having the inner layer portion sandwiched therebetween and formed integrally therewith, the foamed body being characterized in that:

each of the surface layer portions has a thickness of 0.1 mm to 3.0 mm and comprises a nonexpanded structure or an expanded structure up to 10 μm, preferably to 5 μm in cell diameter, the expanded inner layer portion having cells up to 6.0 mm in average cell diameter in a direction parallel to the plane and including at least 70% of open cells in a direction perpendicular to the plane, and the foamed body comprises an expanded structure up to 0.20 g/cm$^3$ in average density.

The term a "direction perpendicular to the plane" refers to a direction perpendicular to the surface of the foamed body in the form of a sandwich, i.e., the direction of thickness of the foamed body, and the term a "direction parallel to the plane" refers to a direction parallel to the surface of the foamed body, i.e., a direction perpendicular to the direction of the thickness.

Because of the cell form described, the expanded inner layer portion has cell walls providing a rib structure along the direction of thickness. Although the cell form is not limited specifically in section along the direction parallel to the plane, a honeycomb form is desirable for improved compressive strength. Such an expanded structure gives the body both high rigidity against compression in the direction of thickness and a low density realized by the formation of open cells.

When the foamed body is bent, a tensile force acts on the front surface layer portion a1 and a compressive force on the rear surface layer portion a2 as shown in FIG. 9. In spite of the presence of the expanded inner layer portion b, the two surface layer portions a which have high rigidity enable the foamed body to exhibit high flexural rigidity against the above two forces.

Each of the surface layer portions has a thickness of 0.1 to 3.0 mm. From the viewpoint of ensuring both an improvement in flexural strength and forming by expansion, the preferred thickness is 0.3 to 1.2 mm. If too thin, the surface layer portion itself is low in rigidity, presenting difficulty in affording the contemplated flexural strength. An attempt to obtain a molding wherein the surface layer portions are at least 3.0 mm in thickness encounters difficulty in increasing the expansion ratio of the expanded inner layer portion, consequently giving an increased average density to the foamed body. If it is attempted to obtain a foamed body of high average density, the resin will not expand to the desired volume of enlarged cavity or the resin surface will develop irregularities different from the shape of the mold.

The expanded inner layer portion should be up to 6.0 mm in average cell diameter in a direction parallel to the plane to assure the foamed body of compressive strength in a direction perpendicular to the plane, whereas if an article acting to compress the foamed body has a small area of contact as when the foamed body of the invention is compressed by the finger or a ball-point pen, the average cell diameter is preferably up to 4.0 mm.

If the cell diameter is not smaller than 6.0 mm or the compressing article has a small area of contact, the number of ribs contributing to an improvement in compressive strength will be smaller, failing to afford a satisfactory compressive strength.

The term "average cell diameter" refers to the average value of cell diameter in a direction parallel to the plane, as measured in a section parallel to the plane in the midportion of the thickness of the expanded inner layer portion of the foamed body. The measurement is done under a magnifying microscope. The range of measurement is 5 mm square when the average cell diameter is up to 100 μm, 15 mm square when the average cell diameter is over 100 μm to up to 1 mm, or 50 mm square when the average cell diameter is over 1 mm. The average value of cell diameters at optional 30 locations within the range is calculated.

The ratio of open cells communicating with one another in a direction perpendicular to the plane (open cell ratio) should be at least 70%. If this ratio is less than 70%, the body has a lower compressive strength in a direction perpendicular to the plane.

An open cell ratio of at least 70% means that the value obtained by checking cells for intercommunication by the air pycnometer method (ASTM D 2856) is at least 70%. For the determination of the value, the apparent density is measured, with the surface layer portions made integral with the expanded inner layer portion, and the actual volume of the sample was measured by the air pycnometer method, with the surface layer portions separated from the expanded inner layer portion.

The invention provides as a thirteenth feature thereof a foamed body according to the twelfth feature which is prepared from a polypropylene resin serving as the thermoplastic resin. Thus the invention provides a foamed body of polypropylene resin comprising an expanded inner layer portion and two surface layer portions having the inner layer portion sandwiched therebetween and formed integrally therewith, the foamed body being characterized in that:

the foamed body is at least 1.0 MPa in compressive strength in a direction perpendicular to the plane, at least 0.025 GPa in modulus in compression in a direction perpendicular to the plane and at least 1.0 MPa in flexural strength, the foamed body having an average density of up to 0.20 g/cm$^3$.

The polypropylene resin is not limited specifically. Examples of useful resins are a common polypropylene in the form of a homopolymer, random copolymer or block copolymer, metallocene polypropylene, a long-chain branched polypropylene, and polypropylene having other component incorporated therein by graft polymerization. These resins can be used singly, or at least two of them are used in combination.

When the average density is in excess of 0.2 g/cm$^3$, it is difficult to obtain a lightweight foamed body.

The compressive strength is measured along the thickness of a test piece at a compressing rate of the thickness×0.1 mm/min, the test piece comprising only an expanded inner layer portion with surface layer portions removed.

The invention provides as a fourteenth feature thereof a foamed body of thermoplastic resin comprising an expanded inner layer portion and two surface layer portions having the inner layer portion sandwiched therebetween and formed integrally therewith, the foamed body being characterized in that:

each of the surface layer portions has a thickness of 0.1 mm to 3.0 mm and comprises a nonexpanded structure or an expanded structure up to 10 μm, preferably up to 5 μm, in cell diameter, the expanded inner layer portion having cells up to 4.0 mm in average cell diameter in a direction parallel to the plane and including at least 65% of cells which are 2 to 6 in flatness ratio, i.e., in the ratio of the cell diameter thereof in a direction perpendicular to the plane to the cell diameter thereof in a direction parallel to the plane (former/latter), the foamed body comprising an expanded structure up to 0.12 g/cm$^3$ in average density.

Because of the flat cell structure described, the foamed body has thick cell walls in the direction of thickness and thin cell walls in the direction of the plane. The body has high rigidity against compression in the direction of thickness because of the thick cell walls in this direction and has great cell volumes since the cell walls are thin in the direction of the plane. These features realize both high rigidity and a high expansion ratio at the same, time. Furthermore, the closed cell structure affords a high heat-insulating property.

The foamed body has low heat-insulating properties when the expanded inner layer portion has cells which are greater than 4.0 mm in average cell diameter in a direction parallel to the plane, when the flatness ratio is in excess of 6, or when the foamed body has an average density of more than 0.12 g/cm$^3$. In the case where the flatness ratio is smaller than 2.0, or when the amount of cells with a flatness ratio of 2 to 6 is less than 65%, a satisfactory compressive strength is not available.

The invention provides as a fifteenth feature thereof a foamed body of thermoplastic resin comprising an expanded inner layer portion and two surface layer portions having the inner layer portion sandwiched therebetween and formed integrally therewith, the foamed body being a foamed body of polypropylene characterized in that:

the foamed body is up to 0.070 W/mK in thermal conductivity, at least 0.25 MPa in compressive strength in a direction perpendicular to the plane, at least 0.004 GPa in modulus in compression in a direction perpendicular to the plane and at least 1.0 MPa in flexural strength, the foamed body having an average density of up to 0.12 g/cm$^3$.

If the average density is in excess of 0.12 g/cm$^3$, it is difficult to obtain a lightweight foamed body.

The invention provides as a sixteenth feature thereof a foamed body of polypropylene resin according to any one of the twelfth to fifteenth features which is characterized in that the foamed body is substantially free from any of residues of a chemical foaming agent when the chemical foaming agent is used.

The term "residues" refers to both the unreacted components of the chemical foaming agent and the decomposition products thereof. For example in the case of azodicarbonamide (ADCA), the decomposition products of the chemical foaming agent are HDCA, urazol, cyanuric acid, isocyanuric acid, cyameride, ammonium cyanate, urea, etc. The expression "substantially free from any residue of a chemical foaming agent" as herein used means that when the components of the foamed body are analyzed by IR, the residues are up to 50 ppm.

The thermoplastic resin foamed body according to the twelfth to sixteenth features of the invention can be produced, for example, by the process of the invention according to the second or fourth feature thereof.

BEST MODE OF CARRYING OUT THE INVENTION

Embodiments of the present invention will be described below in detail with reference to the drawings.

Figure 1:
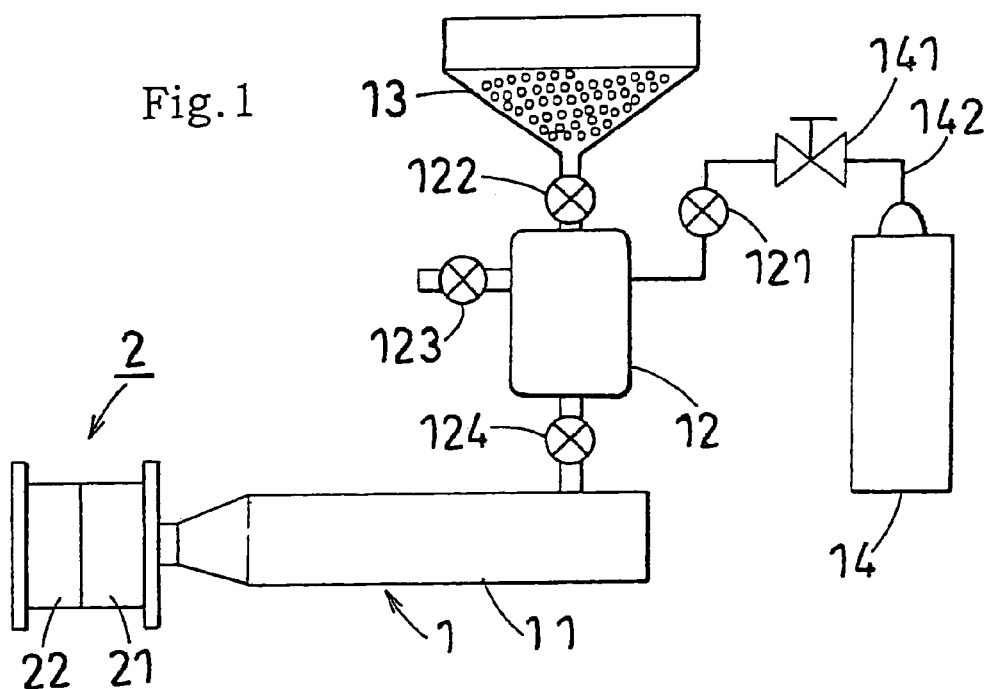
FIG. 1 is a diagram showing an example of injection molding apparatus for use in a process for producing an foamed thermoplastic resin body of the invention.

FIG. 1 is a diagram showing an example of injection molding apparatus. Indicated at 1 in FIG. 1 is the injection molding apparatus, at 11 a resin plasticizing-kneading cylinder of the apparatus 1, at 12 a pressure-resistant chamber provided above the cylinder 11 and positioned toward the rear end thereof, at 13 a hopper disposed above the chamber 12, and at 14 a cylinder for carbon dioxide for use as a foaming agent. The cylinder is connected to the pressure-resistant chamber 12 by a channel 142. A pressure regulating valve 141 is provided on the channel 142. Indicated at 121, 122, 123 and 124 are valves. An injection molding mold 2 comprises a stationary mold member 21 and a movable mold member 22.

A polypropylene (HMS-PP, product of Montell-JPO, 127° C. in melting point) serving as a thermoplastic resin was placed into a hopper 13 and fed to the chamber 12 with the valve 122 opened. The valves 122, 123, 124 were thereafter closed, and carbon dioxide as adjusted to a pressure of 5.5 MPa by the pressure regulating valve 141 was introduced into the chamber 12 via the valve 121.

The interior of the pressure-resistant chamber 12 was maintained at a carbon dioxide pressure of 5.5 MPa and a temperature of 45° C. for 2 hours to dissolve the carbon dioxide in the thermoplastic resin.

Incidentally, an inert gas can be dissolved in a thermoplastic resin under a high pressure by dissolving the inert gas in the resin as melted or by dissolving the gas in the resin in a solid state. Either of these methods can be used, or the two methods are usable in combination.

The inert gas can be dissolved in the molten thermoplastic resin at a high pressure, for example, by mixing the gas with the resin within the injection cylinder 11 via a bend provided at an intermediate portion of the cylinder. In this case, the molten thermoplastic resin serves as a pressure seal.

The inert gas can be dissolved in the solid thermoplastic resin, for example, by:

(1) dissolving the inert gas in the thermoplastic resin in the form of pellets or a powder within a pressure container or the like in advance, or (2) dissolving the inert gas in the thermoplastic resin by supplying the gas to a region of the injection molding apparatus from the hopper to a solid transport portion thereof.

In the case of the method (2) above, it is desirable to incorporate a pressure-resistant seal structure into the screw drive shaft and the hopper so as to prevent the inert gas from evaporating off from the injection cylinder 11.

The inert gas can be supplied from the gas cylinder 14 directly to the injection cylinder 11, or the gas can be supplied as pressurized with an unillustrated plunger pump.

The thermoplastic resin containing carbon dioxide was fed from the pressure-resistant chamber 12 to the cylinder 11 set at 190° C. via the valve 124. The resin as collected in a measuring portion toward the front end of the cylinder 11 was injected into an initial cavity 3 having a thickness of 3 mm via a runner 5 and a gate 4 as shown in FIG. 2.

Figure 2:
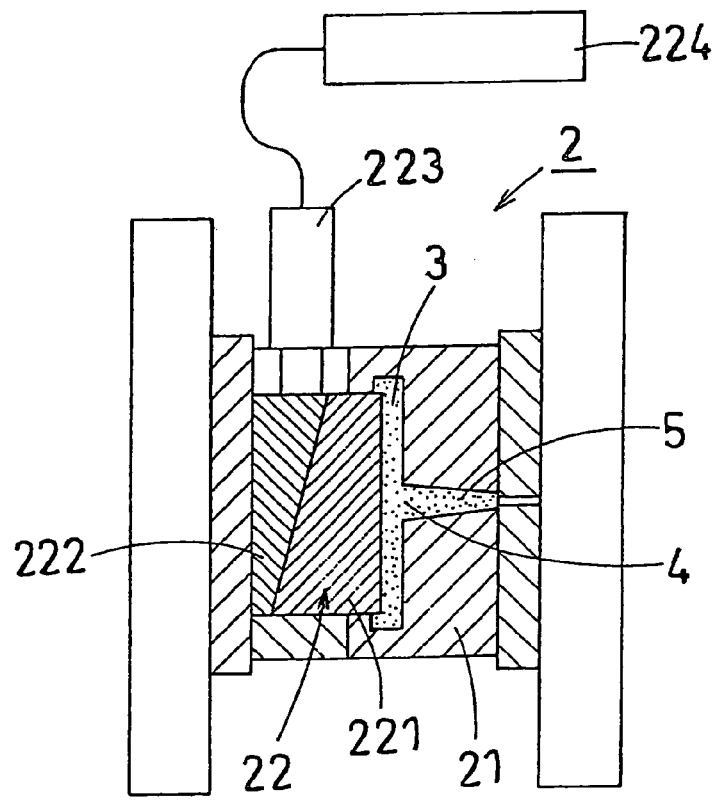
FIG. 2 is a view in horizontal section showing a mold before the cavity thereof is enlarged.
Figure 3:
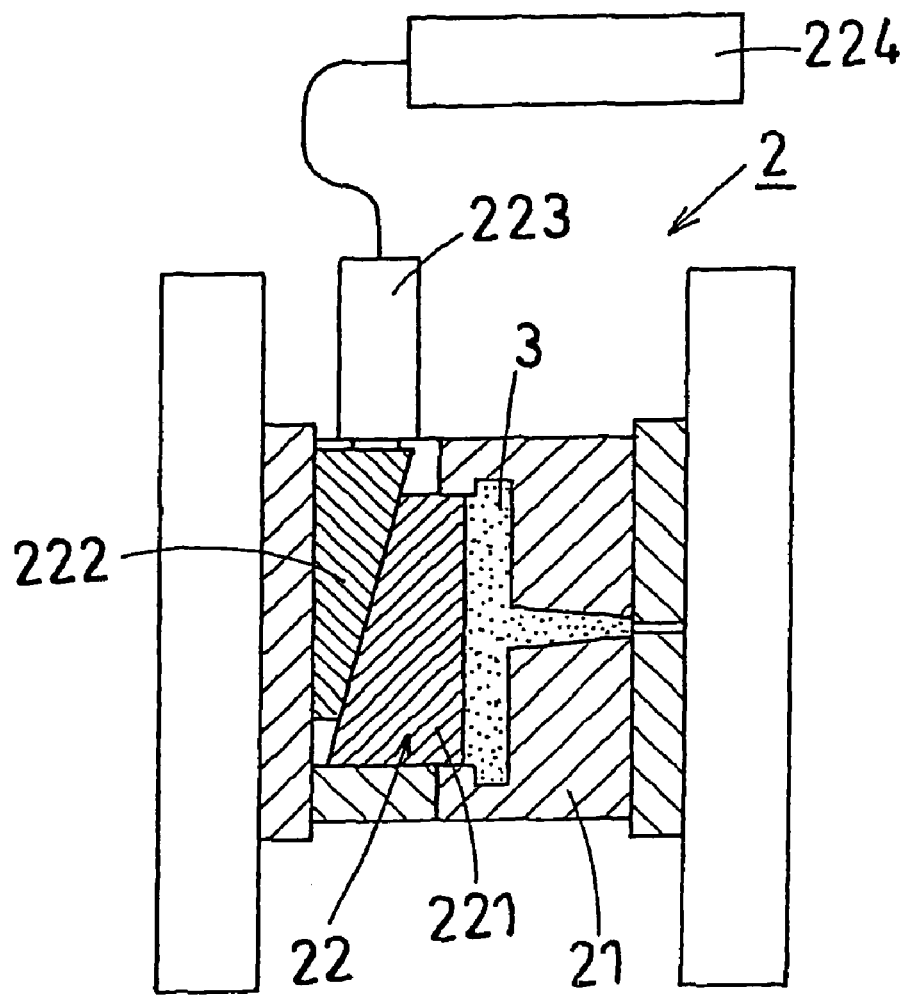
FIG. 3 is a view in horizontal section showing the mold of FIG. 2 after the cavity thereof is enlarged.

With reference to FIGS. 2 and 3, the movable mold member 22 comprises a movable piece 221 movable forward or rearward in the direction of thickness of the cavity, and a wedge piece 222 movable upward or downward by the operation of a hydraulic cylinder 223 connected to a hydraulic unit 224. The cavity 3 is diminished when the wedge piece 222 is lowered as seen in FIG. 2 or is enlarged when the wedge piece 222 is raised as shown in FIG. 3.

Figure 4:
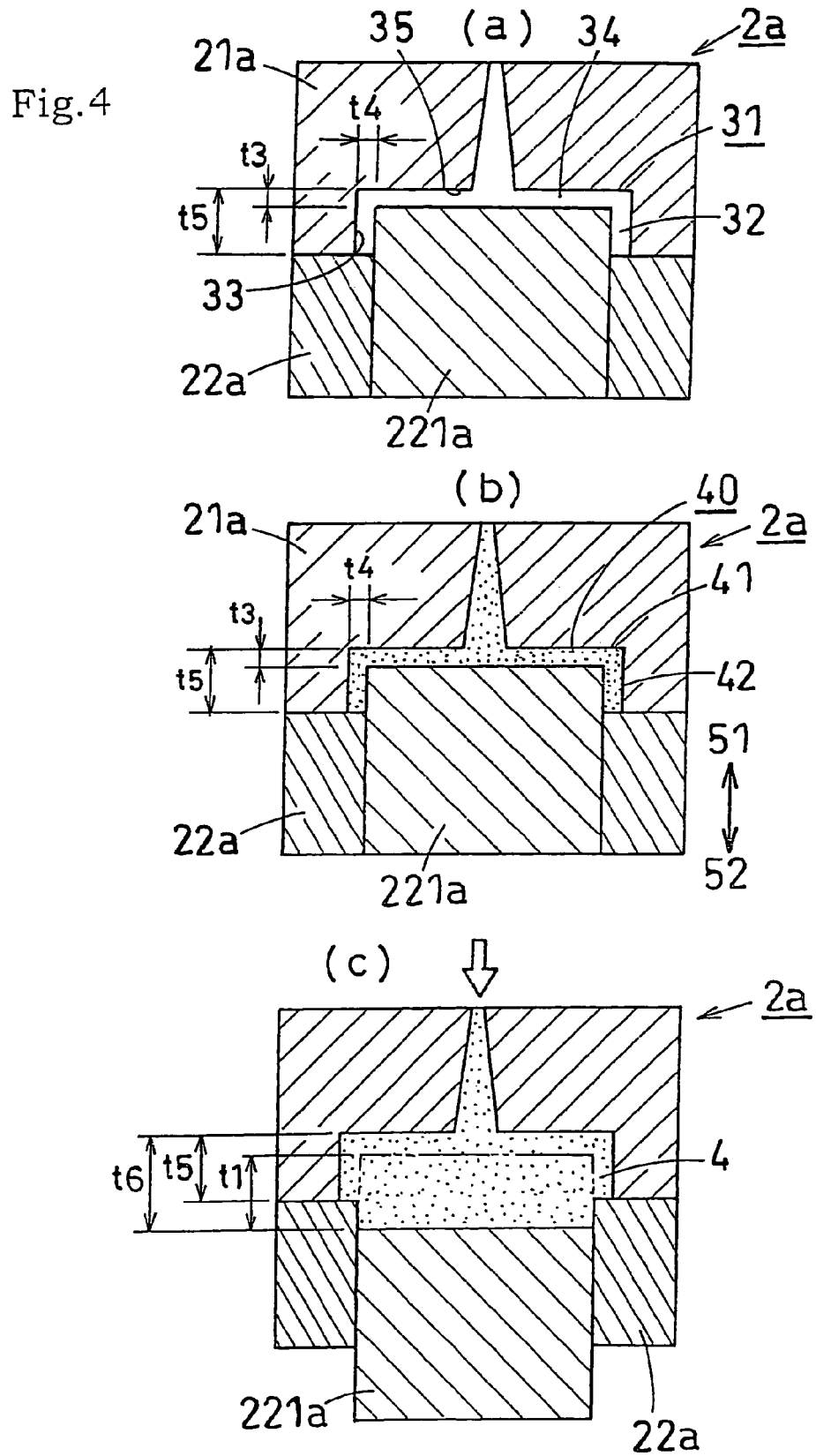
FIG. 4 includes views in horizontal section showing a mold for producing foamed thermoplastic resin bodies of the invention.

FIG. 4 shows an example of mold of the invention.

With reference to the mold 2a shown in FIG. 4, a movable mold member 22a comprises a movable piece 221a and an immovable piece outside the movable piece 221a, an initial cavity 31 is defined by a stationary mold member 21a, the movable piece 221a and the immovable piece, and one end of a movable piece 221a of the movable mold member 22a is movable forward or rearward (51 or 52) within the cavity 31 along the direction of thickness of the cavity. As shown in FIG. 4(a), the initial cavity 31 is in the form of a tube having a bottom and a recessed section along the direction of forward or rearward movement. When the initial cavity 31 is filled with molten resin as shown in FIG. 4(b), a filled resin layer 40 is therefore formed which is tubular, has a bottom and a recessed section in the direction of forward or rearward movement, and comprises a main body portion 41 and a tubular peripheral portion 42. When the movable piece 221a is subsequently moved rearward toward the direction 52 as shown in FIG. 4(c), the central portion of the filled resin layer 40 expands following the retraction of the movable piece 221a to form a foamed body 4 of desired shape.

The tubular peripheral portion 42 of the filled resin layer 40 can be held at a high temperature by making the thickness t4 of the peripheral portion 42 larger than the thickness t3 of the main body portion 41. This makes the foamed body 4 easier to produce by enlarging the cavity 31.

Figure 5:
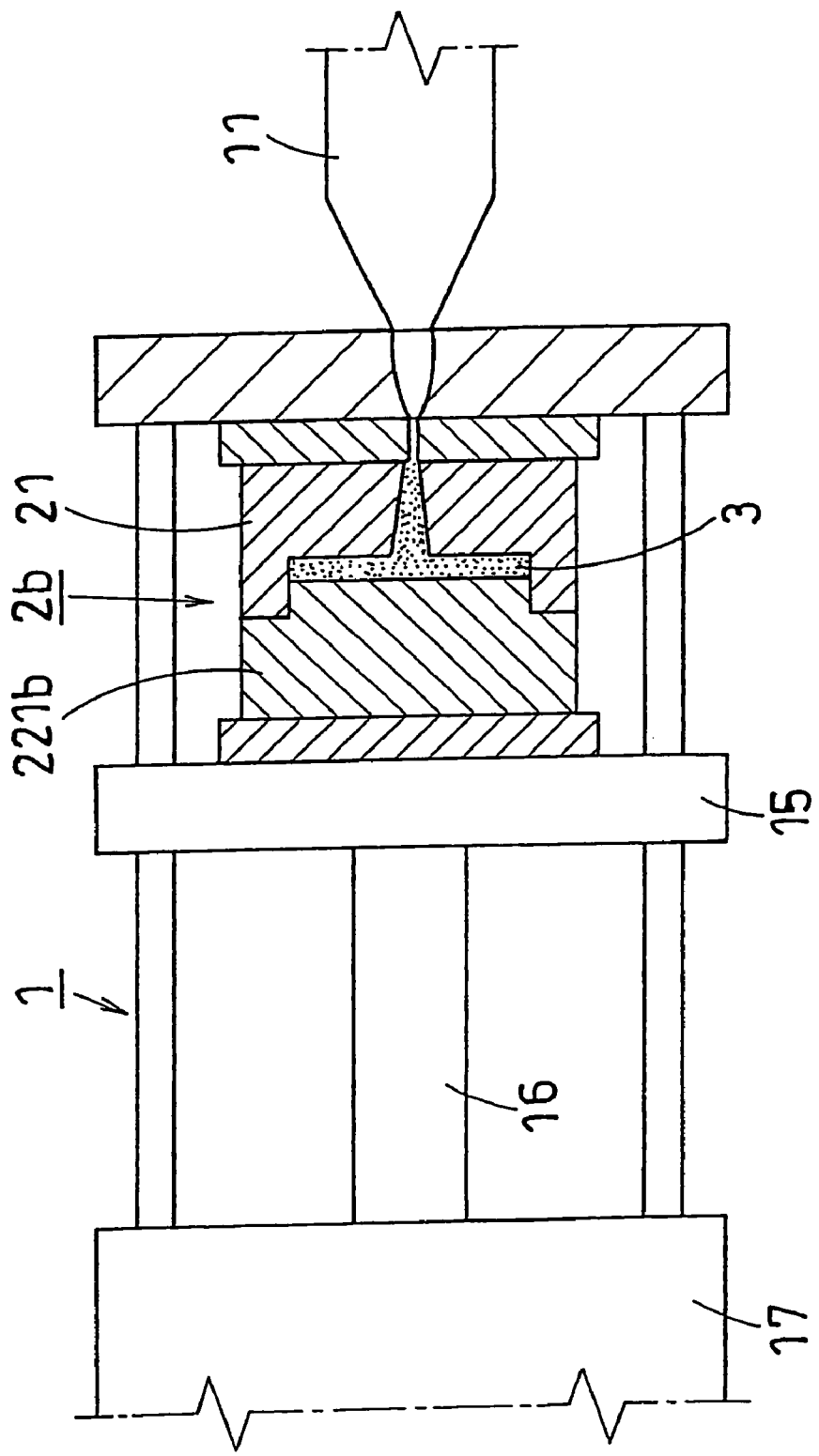
FIG. 5 is a view in horizontal section showing other cavity enlarging means.
Figure 6:
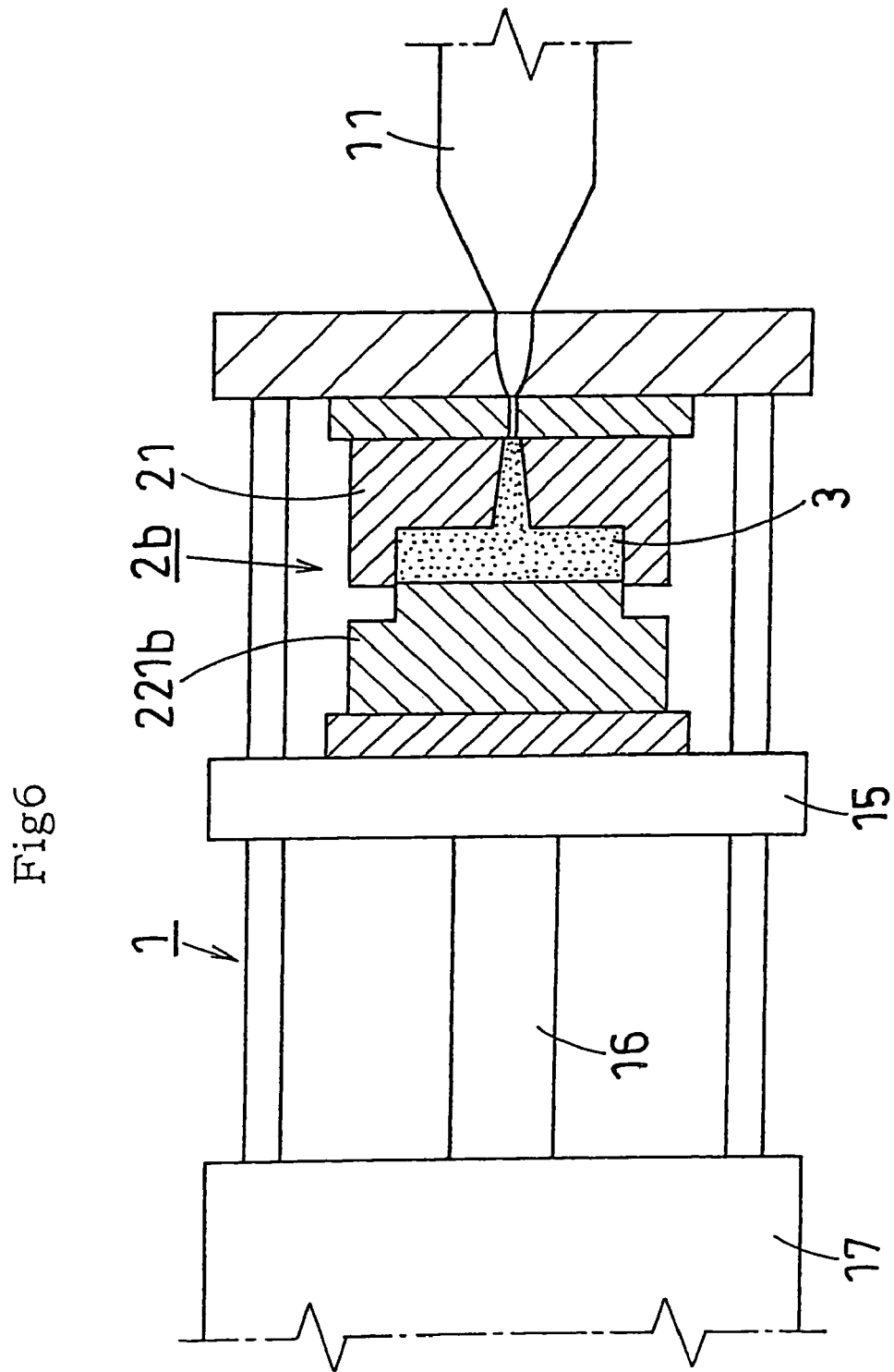
FIG. 6 is a view in horizontal section showing a cavity as enlarged by the cavity enlarging means shown in FIG. 4.

FIGS. 5 and 6 are diagrams for illustrating other example of means for expanding a cavity 3. Instead of the enlarging means for the cavity 3 shown in FIGS. 2 and 3 which means includes the wedge piece 222, hydraulic unit 224 and hydraulic cylinder 223, used as this enlarging means is an opening device for a mold 2b of an injection molding apparatus 1.

A movable piece 221b is movable forward or rearward along with a movable mold member mount plate 15 by the operation of operating rod 16 of a hydraulic cylinder 17 of the apparatus 1. FIG. 4 shows the cavity 3 as diminished, with the movable piece 221b moved forward along with the mount plate 15. FIG. 5 shows the cavity 3 as enlarged, with the movable piece 221b moved rearward along with the mount plate 15.

Figure 7:
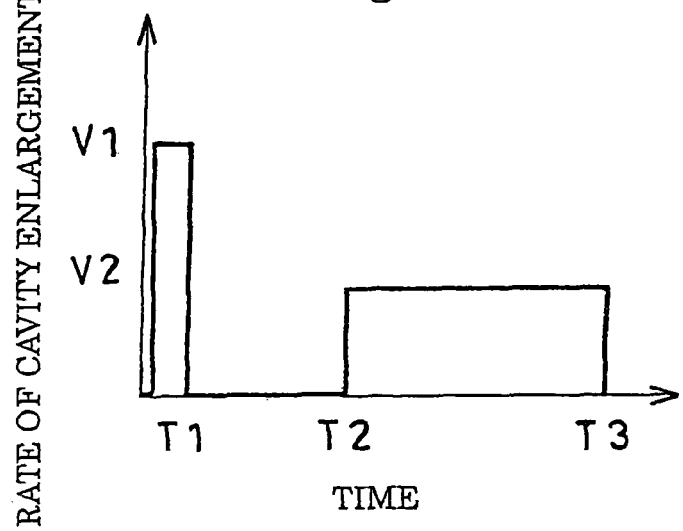
FIG. 7 is a graph showing the relationship between the rate of cavity enlargement and the time, as involved in the process for producing the foamed thermoplastic resin body of the invention.

FIG. 7 shows the relationship between the rate of cavity enlargement and the time, involved in the process of the invention for producing foamed thermoplastic resin bodies. The cavity is enlarged at a rate of V1 in a primary cavity enlarging step, i.e., during the period from the start until time T1, the enlargement is interrupted at time T1, and the cavity is enlarged at a rate V2 in a secondary cavity enlarging step, i.e., from time T2 to time T3.

Example 1

First and Third Features of the Invention

With reference to FIG. 4(a), a molten polypropylene resin was filled into the initial cavity 31 in the form of a tube having a bottom and a recessed section along the direction of forward or rearward movement (3 mm in width t3 along this direction of the main cavity width 34 corresponding to the bottom portion thereof). The cavity 31 was thereafter held in its shape as filled with the resin, the movable piece 221a was moved rearward by 12 mm by raising the wedge piece 222 with the hydraulic cylinder 223 upon the average temperature of the resin dropping to 180, 150 or 120° C. (2 sec, 9 sec or 22 sec, respectively, in holding time from the completion of filling until the cavity enlargement) to enlarge the cavity 31 to the increased final cavity width. The rate of enlargement of the cavity 31 at this time was 5 mm/sec.

The average temperature of the molten resin when the movable piece 221a was to be moved rearward was controlled by holding the initial cavity 31 in its shape as filled with the resin for a specified period of time. The temperature of 190° C. for cavity enlargement listed in Table 1 below is the temperature involved in the condition that the cavity was held in shape as filled with the resin for 0 sec.

The foamed body of thermoplastic resin in the cavity 31 was thereafter cooled for 240 sec, and then the mold 2 was opened to withdraw the foamed body 4.

Table 1 shows the result obtained by observing the foamed bodies thus prepared.

TABLE 1

| Temp. (° C.) when cavity is enlarged | Cell size | Smoothness |
|---|---|---|
| 190 | Coarse | x |
| 180 | Coarse | ○ |
| 150 | Fine | ○ |
| 120 | Fine | x |

○: good
x: unacceptable

[Evaluation]

Table 1 reveals that the foamed body of Example 1 had fine cells in the case where the average temperature of the resin was 120° C. or 150° C. when the cavity was enlarged. When the average temperature of the resin was in excess of the range [the melting point +30° C.] as in the case of 180 or 190° C., coarse cells were obtained with large voids found in the interior of the expanded resin body.

When the resin average temperature for enlarging the cavity was 150° C. or 180° C., the body exhibited high smoothness. However, when the resin average temperature for cavity enlargement was below the above range, e.g., 120° C., the thermoplastic resin failed to expand to the desired shape and to provide a smooth-surfaced foamed body. The resin failed to expand to the desired shape and to afford a smooth-surfaced foamed body also when the resin average temperature was 190° C. for cavity enlargement.

Example 2

Second and Fourth Features of the Invention

Primary Cavity Enlarging Step

With reference to FIG. 4(a), a molten polypropylene resin was filled into the initial cavity 31 which was 3 mm in width t3 of the main cavity width 34. The cavity 31 was thereafter held in its shape as filled with the resin for 0.5 sec, and the movable piece 221a was moved rearward (4 mm) to an intermediate position by raising the wedge piece 222 with the hydraulic cylinder 223 upon the average temperature of the resin dropping to 185° C. The rate of enlargement of the cavity 31 was 5 mm/sec in this primary cavity enlarging step.

Secondary Cavity Enlarging Step

The enlargement of the cavity was then interrupted at the intermediate position, and the movable piece 221a was thereafter moved rearward by raising the wedge piece 222 again with the hydraulic cylinder 223 upon the temperature of the resin central portion in the direction of thickness dropping to 190° C., 170° C., 150° C. or 120° C. (0 sec, 10 sec, 14 sec or 31 sec, respectively, in cavity enlargement interrupting time) to enlarge the cavity to an increased final cavity width of 26 mm. The rate of enlargement of the cavity 31 at this time was 10 mm/sec.

The foamed thermoplastic resin body in the cavity 31 was cooled for 360 sec after this secondary cavity enlarging step, and the mold 2 was opened to withdraw the foamed body 4.

Table 2 shows the result obtained by observing the foamed bodies thus prepared.

TABLE 2

| Resin central temp. (° C.) for secondary cavity enlargement | Cell size | Smoothness |
|---|---|---|
| 190 (no interrupt) | Void | x |
| 170 | Fine | ○ |
| 150 | Fine | ○ |
| 120 | Fine | x |

○: good
x: unacceptable

[Evaluation]

Table 2 reveals that the foamed body of Example 2 had fine cells when the resin average temperature for starting the primary cavity enlarging step was 185° C. which was within the range of [the melting point to the melting point +60° C.] and when the temperature of the resin central portion along the direction of thickness for starting the secondary cavity enlarging step was 170° C., 150° C. or 120° C. However, if the enlargement of the cavity was not interrupted between the primary and second cavity enlarging steps and when the temperature of the resin central portion along the direction of thickness for starting the secondary cavity enlarging step was 190° C., a void occurred in the central portion of the foamed thermoplastic resin body obtained, with coarse cells present in the other portion. Moreover, the thermoplastic resin foamed body failed to expand to the desired shape and to afford a smooth-surfaced foamed body.

In the case where the resin central portion temperature was 170° C. or 150° C. when the secondary enlargement of the cavity was performed, the foamed body had excellent surface smoothness. However, if the resin central portion temperature was below the melting point, e.g., 120° C., when the secondary cavity enlargement was done, the foamed thermoplastic resin body failed to expand to the desired shape and to afford a smooth-surfaced foamed body.

Example 3

The same procedure as in the primary cavity enlarging step of Example 2 was performed except that in the primary cavity enlarging step, the movable piece 221a was moved rearward upon the average temperature of the resin filled in the initial cavity 31 dropping to 195, 180 or 125° C.

The same procedure as in the secondary cavity enlarging step of Example 2 was performed except that in the secondary cavity enlarging step, the movement of the cavity was interrupted until the temperature of the central portion of the resin in the direction of its thickness decreased to 160° C.

Table 3 shows the result obtained by observing the foamed bodies prepared.

TABLE 3

| Average temp. (° C.) for primary cavity enlargement | Cell size | Smoothness |
| --- | --- | --- |
| 195 | Coarse | ○ |
| 180 | Fine | ○ |
| 125 | Fine | x |

○: good
x: unacceptable

[Evaluation]

Table 3 reveals that the foamed body of Example 3 had fine cells when the average resin temperature was 180° C. or 125° C. when the primary cavity enlargement was performed.

However, under the condition that the average resin temperature was in excess of the range [the melting point +60° C.], e.g., 195° C., when the cavity was enlarged, the foamed body had coarse cells, with a hollow portion found in its central portion.

The foamed body was excellent in smoothness if the average resin temperature was 195° C. or 180° C. when the primary cavity enlargement was done. However, if the average resin temperature was below the above range, e.g., 125° C., when the primary cavity enlargement was done, the foamed thermoplastic resin body failed to expand to the desired shape and to afford a smooth-surfaced foamed body.

Example 4

The same procedure as in the primary cavity enlarging step of Example 2 was performed except that in the primary cavity enlarging step, the movable piece 221a was moved rearward to enlarge the cavity 31 at a rate of 0.5, 5 or 10 mm/sec upon the average temperature of the resin filled in the initial cavity 31 dropping to 180° C.

The same procedure as in the secondary cavity enlarging step of Example 2 was performed except that in the secondary cavity enlarging step, the movement of the cavity was interrupted until the temperature of the central portion of the resin in the direction of its thickness dropped to 160° C.

Table 4 shows the result obtained by observing the foamed bodies prepared.

TABLE 4

| Rate of primary cavity enlargement (mm/sec) | Cell size | Appearance |
| --- | --- | --- |
| 0.5 | Coarse | ○ |
| 5 | Fine | ○ |
| 10 | Coarse | x |

○: good
x: unacceptable

[Evaluation]

Table 4 reveals that the foamed body of Example 4 had fine cells when the rate of primary cavity enlargement was 5 mm/sec. Coarse cells were observed if the rate of primary cavity enlargement was outside the range of the invention.

The foamed body had an excellent appearance when the rate of primary cavity enlargement was 0.5 or 5 mm/sec.

Example 5

The same procedure as in the primary cavity enlarging step of Example 2 was performed except that in the primary cavity enlarging step, the movable piece 221a was moved rearward upon the average temperature of the resin filled in the initial cavity 31 dropping to 180° C.

The same procedure as in the secondary cavity enlarging step of Example 2 was performed except that in the secondary cavity enlarging step, the movement of the cavity was interrupted until the temperature of the central portion of the resin in the direction of its thickness dropped to 160° C., with the rate of enlargement of the cavity 31 set at 1, 10 or 20 mm/sec.

Table 5 shows the result obtained by observing the foamed bodies prepared.

TABLE 5

| Rate of secondary cavity enlargement (mm/sec) | Cell size | Appearance | Smoothness |
| --- | --- | --- | --- |
| 1 | Coarse | ○ | x |
| 10 | Fine | ○ | ○ |
| 20 | Coarse | x | ○ |

○: good
x: unacceptable

[Evaluation]

Table 5 reveals that the foamed body of Example 5 had fine cells when the rate of secondary cavity enlargement was 10 mm/sec.

Coarse cells or hollow portions were observed if the rate of secondary cavity enlargement was 1 or 20 mm/sec.

The foamed body had an excellent appearance when the rate of secondary cavity enlargement was 1 or 10 mm/sec. Furthermore, an expanded molding of excellent smoothness was obtained when the rate of secondary cavity enlargement was 10 or 20 mm/sec.

Example 6

The same procedure as the primary cavity enlarging step of Example 2 was performed with the exception of filling in the primary cavity enlarging step a molten thermoplastic resin into the initial cavity 31 shown in FIG. 4(a) which was 3 mm in the width t3 of the main cavity space 34 in the direction of forward or rearward movement, 0, 3 or 12 mm in the width t4 of the peripheral cavity space 32, and 0, 5 or 15 mm in the length t5 of the peripheral cavity space 32 in the direction of forward or rearward movement, and moving the movable piece 221a rearward upon the average temperature of the resin filled in the cavity 31 dropping to 180° C.

The same procedure as in the secondary cavity enlarging step of Example 2 was performed except that in the secondary cavity enlarging step, the movement of the cavity was interrupted until the temperature of the central portion of the resin in the direction of thickness thereof dropped to 160° C.

Figure 8:
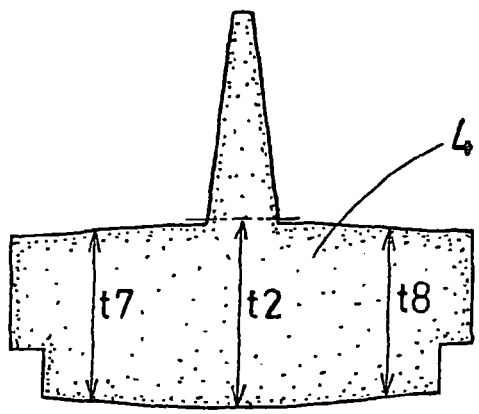
FIG. 8 is a side elevation showing the foamed body obtained.
Figure 9:
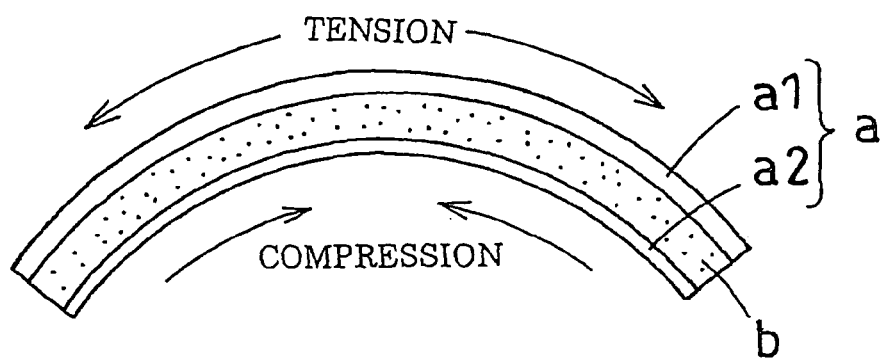
FIG. 9 is a diagram for illustrating the forces occurring when an foamed thermoplastic resin body of the invention is bent.

FIG. 8 shows the foamed body obtained. Table 6 shows the thickness t7 of a left side portion of the foamed body 4, the thickness t2 of the body from the gate portion to the lower end of the central portion, and the thickness t8 of a right side portion thereof.

TABLE 6

| Width t4 (mm) | Width t5 (mm) | Thickness t7 (mm) | Thickness t2 (mm) | Thickness t8 (mm) |
| --- | --- | --- | --- | --- |
| 0 | 0 | 11.2 | 24.0 | 11.0 |
| 3 | 5 | 23.7 | 26.0 | 24.0 |
| 12 | 15 | 26.0 | 26.1 | 25.9 |

TABLE 6-continued

| Width t4 (mm) | Width t5 (mm) | Thickness t7 (mm) | Thickness t2 (mm) | Thickness t8 (mm) |
| --- | --- | --- | --- | --- |

[Evaluation]

With an increase in the length t5 of the peripheral cavity space 32 along the direction of forward or rearward movement, the difference decreases between the thickness t2 of the central portion of the body 4 and the thicknesses t7, t8 of opposite side portions thereof.

Example 7

12th and 13th Features of the Invention

Primary Cavity Enlarging Step

With reference to FIG. 4(a), a molten polypropylene resin was filled into the initial cavity, 31 which was 2 mm in the width t3 of the main cavity width 34. The cavity 31 was thereafter held in its shape as filled with the resin for 5 sec, and the movable piece 221a was moved rearward (2 mm) to an intermediate position by raising the wedge piece 222 with the hydraulic cylinder 223. The rate of enlargement of the cavity 31 was 15 mm/sec in this primary cavity enlarging step.

Secondary Cavity Enlarging Step

The movement of the cavity was interrupted at the intermediate position for 0.5 sec, and the movable piece 221a was thereafter moved rearward by raising the wedge piece 222 again with the hydraulic cylinder 223 to enlarge the cavity to an increased final cavity width of 20 mm. The rate of enlargement of the cavity 31 at this time was 15 mm/sec.

The foamed thermoplastic resin body in the cavity 31 was cooled for 120 sec after this secondary cavity enlarging step, and the mold 2 was opened to withdraw the foamed body 4.

The characteristics of the foamed body thus prepared were measured. Table 7 shows the results.

Figure 10:
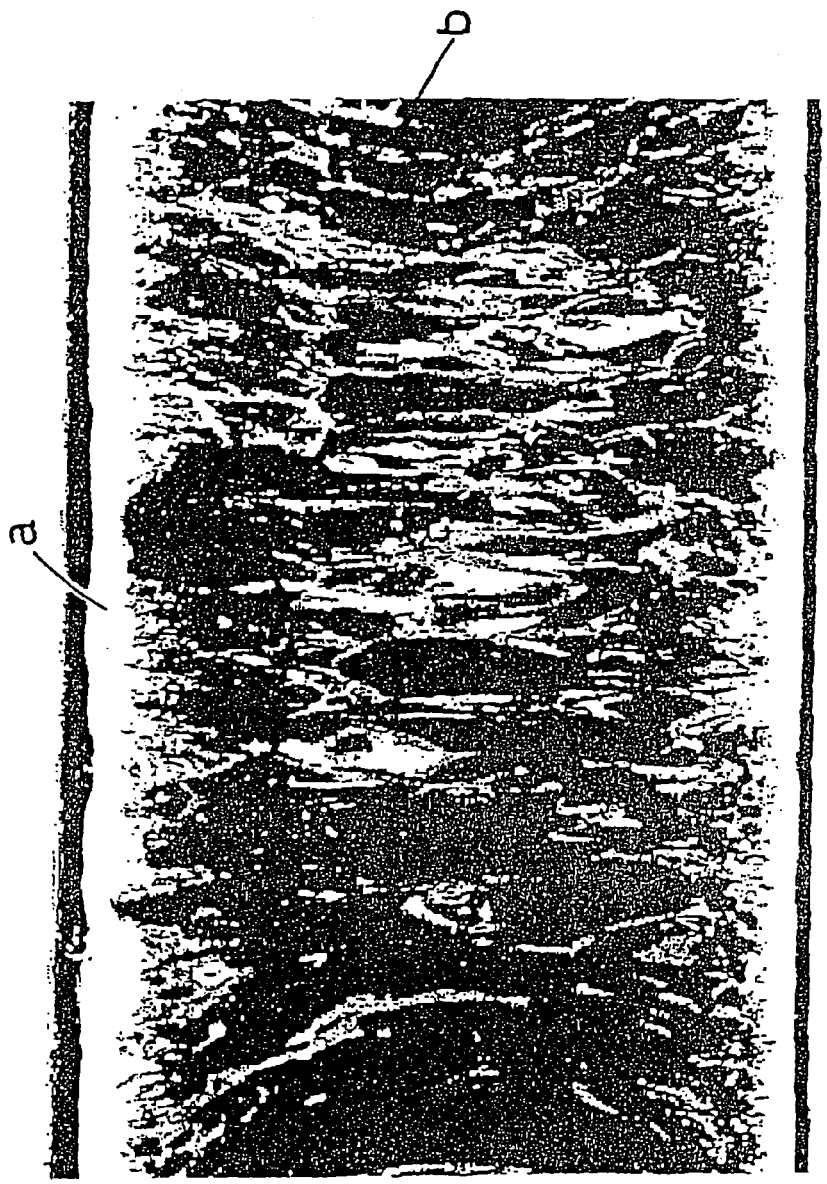
FIG. 10 is a photograph showing in section an foamed thermoplastic resin body obtained in Example 7.

As apparent from the photograph of a section shown in FIG. 10 (as magnified at ×6 under a microscope), the foamed thermoplastic resin body obtained was composed of an expanded inner layer portion b and two surface layer portions a having the portion b sandwiched therebetween integrally therewith.

Comparative Example 1

Example Having Large Cells

A foamed body was prepared by the same procedure as in Example 7 with the exception of holding the molten polypropylene resin containing carbon dioxide in the cavity for 2 sec after filling and until the start of primary enlargement of the cavity and enlarging the cavity at a rate of 3 mm/sec in the primary cavity enlarging step.

Table 7 shows the results obtained by measuring the characteristics of the foamed body prepared.

Comparative Example 2

Example with a Small Open Cell Ratio

A foamed body was prepared in the same manner as in Example 7 with the exception of holding the molten polypropylene resin containing carbon dioxide in the cavity for 2 sec after filling and until the start of primary enlargement of the cavity, enlarging the cavity at a rate of 3 mm/sec in the primary cavity enlarging step, interrupting the enlargement of the cavity for 3 sec between the primary and secondary cavity enlarging steps, and enlarging the cavity at a rate of 10 mm/sec in the secondary cavity enlarging step.

Table 7 shows the results obtained by measuring the characteristics of the foamed body prepared.

TABLE 7

|  | Example 7 | Comp. Ex. 1 | Comp. Ex. 2 |
| --- | --- | --- | --- |
| Compressive strength (MPa) | 1.70 | 0.25 | 0.82 |
| Modulus in compression (GPa) | 0.050 | 0.016 | 0.020 |
| Flexural strength (MPa) | 7.0 | 6.1 | 1.2 |
| Density (g/cm$^3$) | 0.09 | 0.09 | 0.09 |
| Average cell diameter (mm) | 2.0 | 8.5 | 2.7 |
| Open cell ratio (%) | 87 | 75 | 42 |
| Surface layer thickness (mm) | 1.2 | 1.2 | 0.1 |
| Expanded inner layer thickness (mm) | 17.6 | 17.6 | 18.8 |

Example 8

14th and 15th Features of the Invention

A foamed body was prepared in the same manner as in Example 7 with the exception of holding the molten polypropylene resin containing carbon dioxide in the cavity for 11 sec after filling and until the start of primary enlargement of the cavity, enlarging the cavity at a rate of 10 mm/sec in the primary cavity enlarging step, interrupting the enlargement of the cavity for 3 sec between the primary and secondary cavity enlarging steps, and moving the movable piece 221a rearward to an increased final cavity width of 30 mm in the secondary cavity enlarging step to enlarge the cavity 31 at a rate of 5 mm/sec.

Table 8 shows the results obtained by measuring the characteristics of the foamed body prepared.

Figure 11:
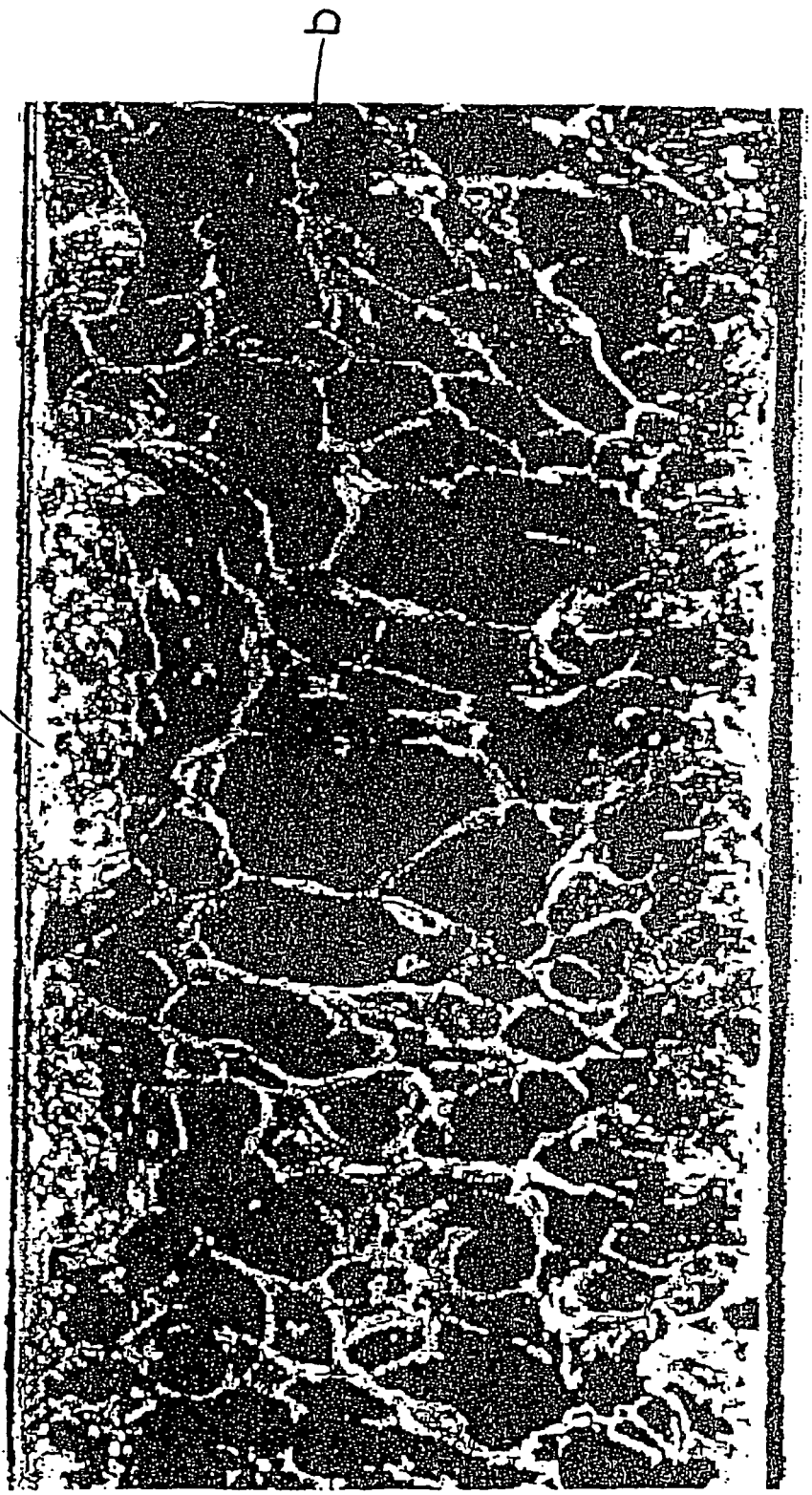
FIG. 11 is a photograph showing in section an foamed thermoplastic resin body obtained in Example 8.
Figure 12:
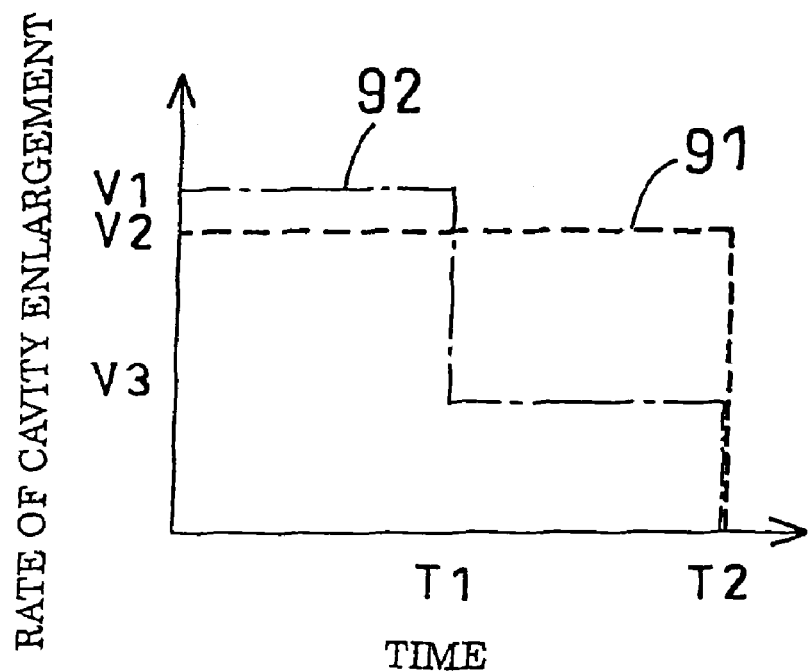
FIG. 12 is a graph showing the relationship between the rate of cavity enlargement and the time, as involved in a conventional process for producing an foamed thermoplastic resin body.
Figure 13:
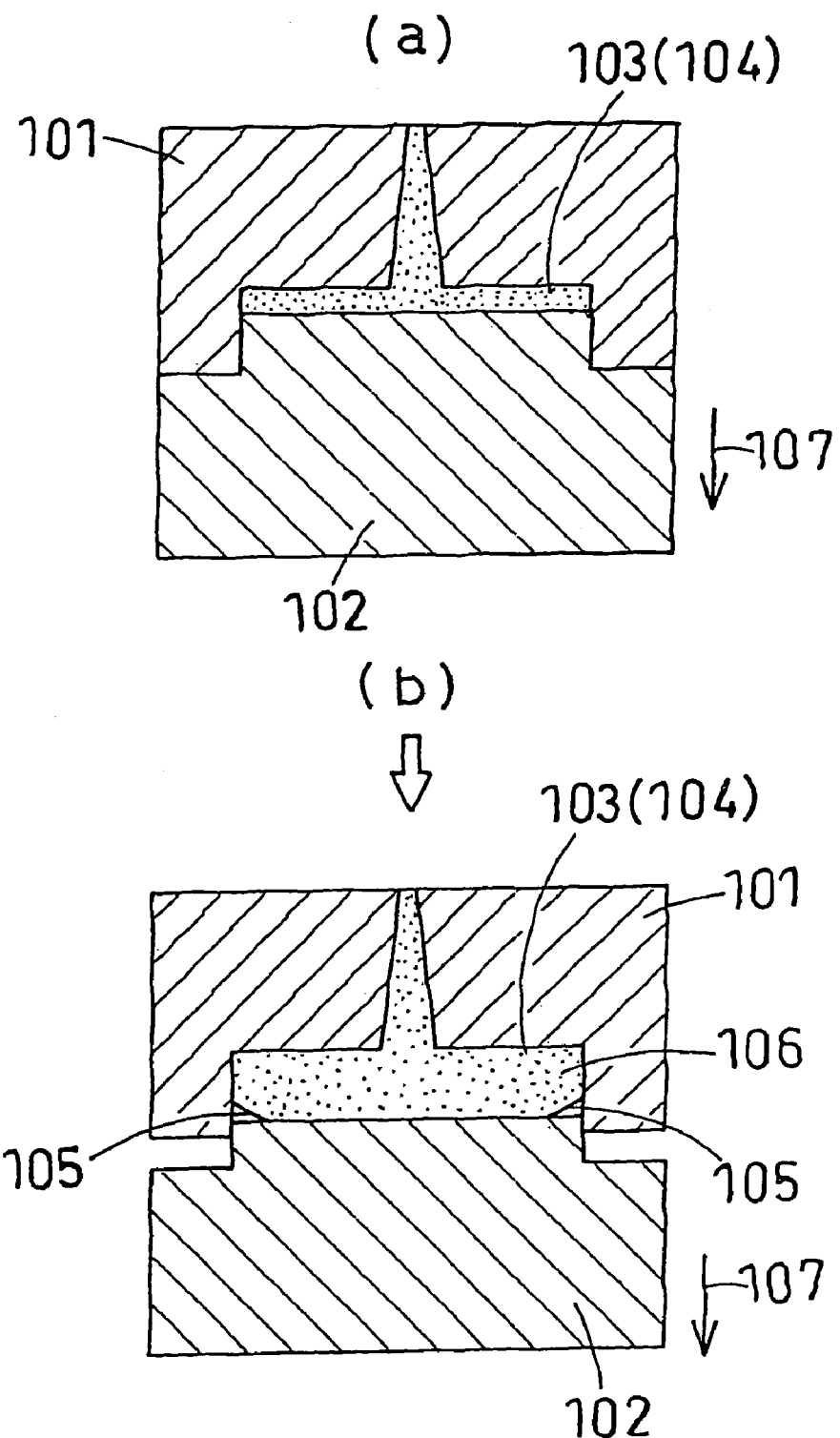
FIG. 13 includes views in horizontal section showing a conventional mold for producing the foamed thermoplastic resin body.

As apparent from the photograph of a section shown in FIG. 11 (as magnified at ×4 under a microscope), the foamed thermoplastic resin body obtained was composed of an expanded inner layer portion b and two surface layer portions a having the portion b sandwiched therebetween integrally therewith.

Comparative Example 3

Example Having Large Cells

A foamed body was prepared in the same manner as in Example 7 with the exception of holding the molten polypropylene resin containing carbon dioxide in the cavity for 7 sec after filling and until the start of primary enlargement of the cavity, enlarging the cavity at a rate of 10 mm/sec in the primary cavity enlarging step, interrupting the enlargement of the cavity for 1 sec between the primary and secondary cavity enlarging steps, and moving the movable piece 221a rearward to an increased final cavity width of 17 mm in the secondary cavity enlarging step to enlarge the cavity 31 at a rate of 5 mm/sec.

Table 8 shows the results obtained by measuring the characteristics of the foamed body prepared.

Comparative Example 4

Example with Great Flatness Ratio

A foamed body was prepared in the same manner as in Example 7 with the exception of holding the molten polypropylene resin containing carbon dioxide in the cavity for 10 sec after filling and until the start of primary enlargement of the cavity, enlarging the cavity at a rate of 10 mm/sec in the primary cavity enlarging step, interrupting the enlargement of the cavity for 0.5 sec between the primary and secondary cavity enlarging steps, and moving the movable piece 221a rearward to an increased final cavity width of 17 mm in the secondary cavity enlarging step to enlarge the cavity 31 at a rate of 5 mm/sec.

Table 8 shows the results obtained by measuring the characteristics of the foamed body prepared.

TABLE 8

|  | Example 8 | Comp. Ex. 3 | Comp. Ex. 4 |
| --- | --- | --- | --- |
| Compressive strength (MPa) | 0.40 | 0.35 | 0.24 |
| Modulus in compression (GPa) | 0.006 | 0.0036 | 0.005 |
| Flexural strength (MPa) | 2.1 | 1.0 | 2.1 |
| Average density (g/cm$^3$) | 0.06 | 0.11 | 0.11 |
| Thermal conductivity (W/mK) | 0.041 | 0.072 | 0.086 |
| Average cell diameter (mm) | 2.3 | 5.2 | 2.7 |
| Cell diam. in thickness direction/cell diam. in plane direction | 3.0 | 2.4 | 6.9 |
| Surface layer thickness (mm) | 1.5 | 1.2 | 1.5 |
| Expanded inner layer thickness (mm) | 27.0 | 14.6 | 14.0 |

The present invention has the following advantages.

Homogeneous foamed bodies having fine cells can be prepared by the foamed thermoplastic resin body production process according to the first or third feature of the invention.

Homogeneous foamed bodies having a high expansion ratio and varying cell diameters can be prepared by the foamed thermoplastic resin body production process according to the second or fourth feature of the invention.

Homogeneous foamed bodies having high dimensional accuracy, a smooth-surfaced excellent appearance and fine cells can be prepared by the foamed thermoplastic resin body production process according to the fifth feature of the invention.

Homogeneous foamed bodies having high dimensional accuracy, a smooth-surfaced excellent appearance, a high expansion ratio and fine cells can be prepared by the foamed thermoplastic resin body production process according to the sixth feature of the invention.

Foamed bodies of stabilized quality and high expansion ratio can be prepared by the foamed thermoplastic resin body production process according to the seventh feature of the invention because the foaming agent used has high ability to effect expansion and can be dissolved in the resin homogeneously.

Foamed bodies which are shaped as desired even at their peripheral portions can be prepared by the foamed thermoplastic resin body forming mold of the eighth feature.

The foamed thermoplastic resin body forming mold according to the ninth, tenth or eleventh feature of the invention is adapted to maintain the resin in its peripheral portion at a temperature higher than that of the resin on the movable piece and therefore to produce with good stability foamed bodies which are shaped as desired even at their peripheral portions. Since the movable mold member can be moved at different times for enlargement by this process, it is possible to prepare homogeneous foamed bodies of high expansion ratio and varying cell diameters.

The foamed thermoplastic resin bodies according to the twelfth and thirteenth features of the invention are extremely high in compressive rigidity and flexural rigidity, lightweight and excellent in heat-insulating properties.

The foamed thermoplastic resin bodies according to the fourteenth and fifteenth features of the invention are excellent in lightweightness and heat-insulating properties and have compressive rigidity and flexural rigidity.

The foamed thermoplastic resin body according to the sixteenth feature of the invention is free from the residues of chemical foaming agent and usable for food uses. Especially when the thermoplastic resin is polypropylene, the foamed body is suited to reuse through recycling and favorably usable for food containers, heat-insulating building materials, house materials, motor vehicle components, etc.

INDUSTRIAL APPLICABILITY

The invention provides foamed bodies of thermoplastic resin having a high expansion ratio, desired shape and cells of desired diameter, especially fine cells. The foamed thermoplastic resin bodies provided by the invention are exceedingly high in compressive rigidity and flexural rigidity, lightweight and outstanding in heat-insulating properties.

The invention claimed is:

1. A process for producing a foamed body of a thermoplastic resin by filling the thermoplastic resin as melted and containing a foaming agent into a cavity of a mold and thereafter enlarging the cavity to expand the resin, the process being characterized in that the process includes:

the primary cavity enlarging step of enlarging the cavity to a predetermined value less than an increased final cavity width upon the average temperature of the molten resin within the cavity reaching the range of the melting point of the resin to [the melting point +60° C.] after holding the cavity in the shape thereof as filled with the molten resin containing the foaming agent subsequently to complete filling of the cavity, the secondary cavity enlarging step of subsequently interrupting the enlargement of the cavity and enlarging the cavity to the increased final cavity width upon the temperature of the resin in its central portion with respect to the thickness thereof reaching a temperature from the melting point to [the melting point +50° C.], wherein the foaming agent is an inert gas.

2. A process for producing a foamed body of a thermoplastic resin according to claim 1 which is characterized by enlarging the cavity at a rate of 5 to 10 mm/sec in the secondary cavity enlarging step.

3. A process for producing a foamed body of a thermoplastic resin according to claim 1, which is characterized by enlarging the cavity at a rate of 2 to 5 mm/sec in the primary cavity enlarging step.

* * * * *